United States Patent [19]

Yamada et al.

[11] Patent Number: 4,752,850
[45] Date of Patent: Jun. 21, 1988

[54] MULTI-TRACK MAGNETIC THIN FILM HEADS

[75] Inventors: Masamichi Yamada; Masakatsu Saito; Takumi Sasaki; Katsuo Konishi, all of Yokohama, Japan

[73] Assignee: Hitachi, Ltd., Tokyo, Japan

[21] Appl. No.: 719,057

[22] Filed: Apr. 2, 1985

[30] Foreign Application Priority Data

Jun. 6, 1984 [JP] Japan ............... 59-114541
Jun. 6, 1984 [JP] Japan ............... 59-114542

[51] Int. Cl.⁴ .................. G11B 5/29; G11B 5/265; G11B 5/147
[52] U.S. Cl. ......................... 360/121; 360/126; 360/123
[58] Field of Search ............... 360/121, 123, 125, 126, 360/127, 122

[56] References Cited

U.S. PATENT DOCUMENTS

| | | | |
|---|---|---|---|
| 4,052,749 | 9/1977 | Nomura et al. | 360/123 |
| 4,488,195 | 12/1984 | Yamagiuchi et al. | 360/120 |
| 4,550,353 | 9/1985 | Hirai et al. | 360/126 |
| 4,558,385 | 12/1985 | Kaminaka et al. | 360/126 |
| 4,559,572 | 12/1985 | Kumasaka et al. | 360/122 |
| 4,598,052 | 6/1986 | Wada et al. | 360/122 |

Primary Examiner—Robert S. Tupper
Assistant Examiner—Melissa J. Koval
Attorney, Agent, or Firm—Fay, Sharpe, Beall, Fagan, Minnich & McKee

[57] ABSTRACT

Multi-track magnetic thin film heads for recording and reproducing an analog signal of an electronic still camera. The heads are constructed on a single non-magnetic substrate. Each of lower magnetic cores for the heads is separately formed in the surface of the non-magnetic substrate, in order to reduce cross talk from adjacent tracks. Further, in order to decrease a resistance of a coil thereof, a distance of back head gap parts of adjacent heads is formed larger than a distance of front head gap parts of the adjacent heads. As the non-magnetic substrate, a ceramic material comprising at least MnO and NiO are used, as a magnetic core material, an amorphous material including Co, Nb and Zr is used, and as a magnetic gap material, Cr or Zr is used.

17 Claims, 8 Drawing Sheets

MULTI-TRACK MAGNETIC THIN FILM HEADS

BACKGROUND OF THE INVENTION

This invention relates to magnetic thin film heads, especially multi-track magnetic thin film heads having characteristics of less cross talk and less impedance noise on a reproducing mode, and a method of producing the same.

In the prior art, multi-track magnetic thin film heads have been used especially for recording a digital signal on a recording medium, for example, a magnetic disc, a magnetic sheet, a magnetic tape, etc. However, in using them for recording/reproducing an analog signal, there are some problems, for example, the cross talk from adjacent magnetic tracks, and the impedance noise on the reproducing mode.

Figure 1A:
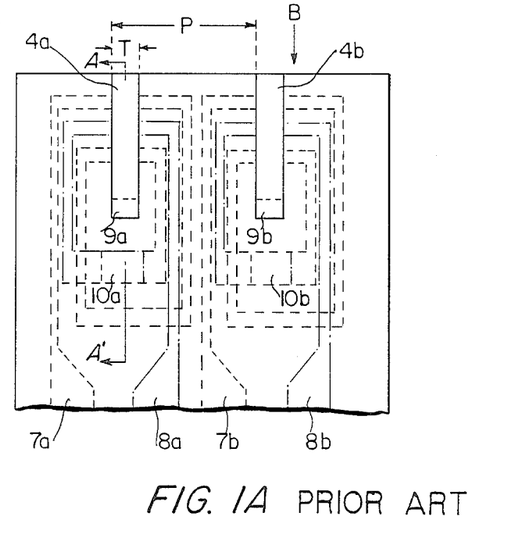
FIG. 1A shows a plane view of multi-track magnetic thin film heads in the prior art.
Figure 1B:
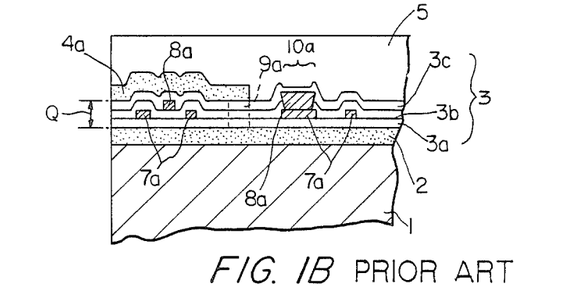
FIG. 1B shows a sectional figure of the A—A' section of FIG. 1A.
Figure 1C:
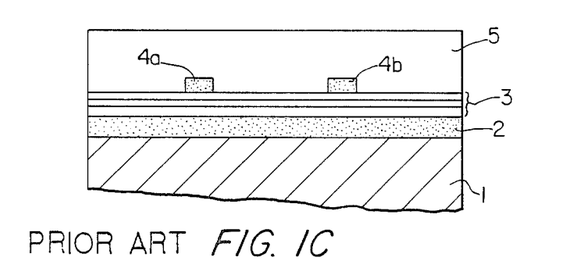
FIG. 1C illustrates a front view from the B direction of FIG. 1A.

Japanese Laid-Open Application No. 58.212616, laid open on Dec. 10, 1983, discloses an example of the prior art. FIGS. 1A, 1B and 1C show a structure of the multi-track magnetic thin film heads disclosed in the application. FIG. 1A depicts a plane view of the multi-track magnetic thin film heads including two magnetic heads. FIG. 1B and 1C show a sectional figure of an A—A' section in FIG. 1A and a front view from the B direction in FIG. 1A, respectively. Referring to FIGS. 1A, 1B and 1C, the numerals 1 and 2 denote a non-magnetic substrate and a lower magnetic core formed on the non-magnetic substrate 1, respectively. On the lower magnetic core, a first insulator 3a is deposited. Next, first layer coils 7a and 7b having a plane shape shown in FIG. 1A are formed on the first insulator 3a. Then, a second insulator 3b is superimposed on them without covering contact parts 10a and 10b. After that, second layer coils 8a and 8b, which are connected to the first layer coils 7a and 7b at the contact parts 10a and 10b, respectively, are formed on the second insulator 3b. Further, a third insulator 3c is superimposed on them, and upper magnetic cores 4a and 4b are deposited on the third insulator 3c. The numeral 5 designates a protective layer. In this configuration magnetic gaps of the heads are constructed by the first, second and third insulators 3a, 3b and 3c, and a track width and a gap length of each head are determined by a width T of the upper magnetic core 4a (4b) and a length Q, which is equal to a total thickness of the first, second and third insulators 3a, 3b and 3c, respectively. A track pitch of adjacent tracks is determined by a length P. As usual, the magnetic gap at a front part of the head is called a front gap, and the magnetic gap indicated by the numeral 9a (9b) is called a back gap. It is well known that there is another type of head, in which the upper magnetic core is connected to the lower magnetic core by a through-hole at a back gap part as shown by the broken line in FIG. 1B.

As briefly mentioned above, in this prior art, there is the cross talk from the adjacent tracks because of a continuity of the lower magnetic core 2 of the heads, and there is the impedance noise on the reproducing mode because it is impossible to use a large space for the coil and the resistance of the coil becomes higher. Further, there is a phase interference in a reproduced signal from the heads, caused by a contour effect of pseudo magnetic gaps, which are mainly formed by the lower edge of the lower magnetic core 2.

SUMMARY OF THE INVENTION

It is an object of the present invention to provide multi-track magnetic thin film heads having less cross talk, less impedance noise on a reproducing mode, and less phase interference in a reproduced signal, and a method for producing the same.

It is another object of the present invention to provide multi-track magnetic thin film heads suitable for recording/reproducing an analog signal, and a method for producing the same.

To attain the above described object, in the present invention, a lower magnetic core is independently constructed for each head, and further a distance between back gap parts of adjacent heads is formed to be larger than a distance between front gap parts of the adjacent heads.

Also, in the present invention, a lower edge of the lower magnetic core at the front gap part is formed in non-parallel alignment with the edges of the front gap, in order to reduce a contour effect.

Further in this invention, a ceramic material comprising at least MnO and NiO is used as a non-magnetic substrate, and further a metal material Cr or Zr is used as a gap material in case that an amorphous material comprising at least Co, Nb and Zr is used as a magnetic core material.

In the steps of producing the heads of this invention, the magnetic core material for constructing an upper magnetic core is deposited to cover inclined parts of lower layers on the non-metallic substrate, too.

DETAILED DESCRIPTION OF THE PREFERRED EMBODIMENT

Figure 2A:
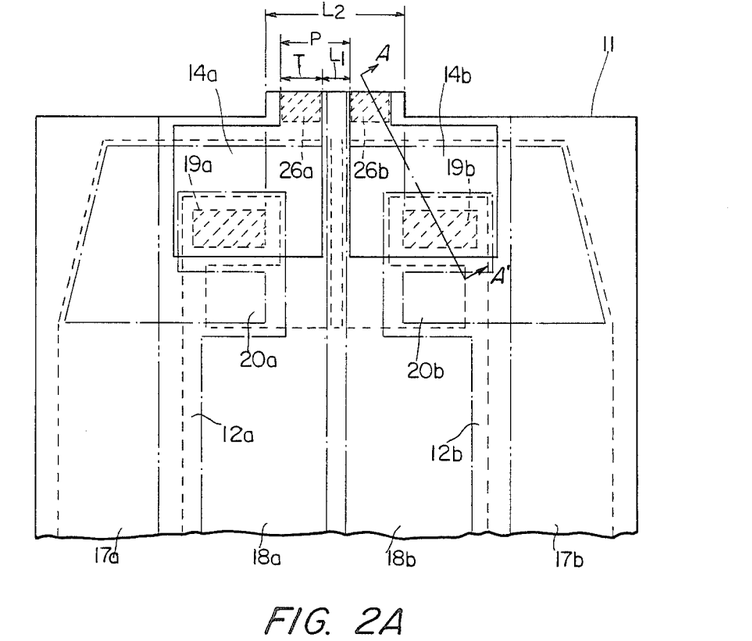
FIG. 2A shows a plane view of multi-track magnetic thin film heads as an embodiment of the present invention.
Figure 2B:
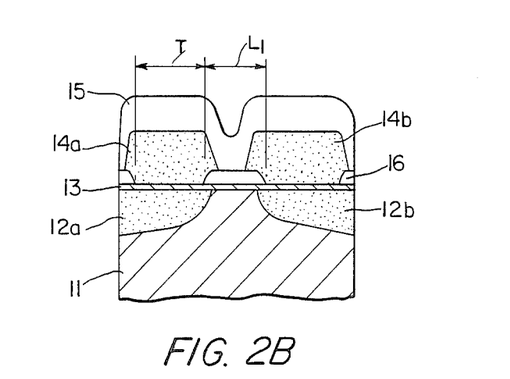
FIG. 2B illustrates a schematic view of a surface, which should touch a magnetic recording material, of the heads shown in FIG. 2A.
Figure 2C:
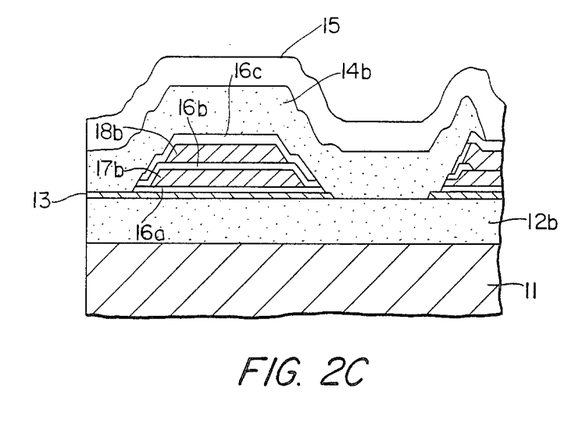
FIG. 2C shows a sectional figure of the A—A' section of FIG. 2A.

The first embodiment of the multi-track magnetic thin film heads will be explained by using FIGS. 2A, 2B and 2C. Referring to FIGS. 2A, 2B and 2C, the numerals 11, 13 and 15 denote a non-magnetic substrate, a gap material and a protective layer, respectively. The numerals 12a, 12b designate lower magnetic cores of adjacent heads, and the numerals 14a, 14b denote upper magnetic cores of the adjacent heads. The numerals 16, 16a, 16b and 16c designate insulating layers. The numerals 17a, 17b and 18a, 18b denote first layer coils and second layer coils, respectively. The numerals 20a, 20b, and 19a, 19b denote through-holes for connecting the first layer coils 17a, 17b to the second layer coils 18a, 18b, and back gap parts for connecting or magnetically coupling the upper magnetic cores 14a, 14b to the lower magnetic cores 12a, 12b, respectively. The back gap parts 20a, 20b are called magnetic core connecting parts too. In this specification, the term "back gap part" includes both meanings. The numerals 26a, 26b denote front gap parts. The front gaps are formed on a surface, which should be adjacent to, e.g. touch, a recording medium, and are shown in FIG. 2B.

As apparent from FIGS. 2A and 2B, the head for each track has an independent lower magnetic core 12a (12b). The lower magnetic core 12a buried in the surface of the nonmagnetic substrate 11 is entirely apart from the lower magnetic core 12b buried in the surface of the non-magnetic substrate 11, so that it becomes possible to reduce the cross talk between the adjacent tracks. Further, especially shown in FIG. 2B, lower edges of the lower magnetic cores 12a, 12b are formed in non-parallel alignment with the edges of the front gaps of the heads, so that it becomes possible to reduce a contour effect. As shown in FIG. 2A, the distance L2 of the back gap parts of the adjacent heads is formed to be larger than the distance L1 of the front gaps thereof. So, even if the distance L1 is formed to be very short, it is possible to make resistances of the first layer coils 17a, 17b and the second layer coils 18a, 18b low, so as to reduce the impedance noise on the reproducing mode. In FIG. 2A, T and P indicate the track width and the track pitch, respectively.

Figure 3:
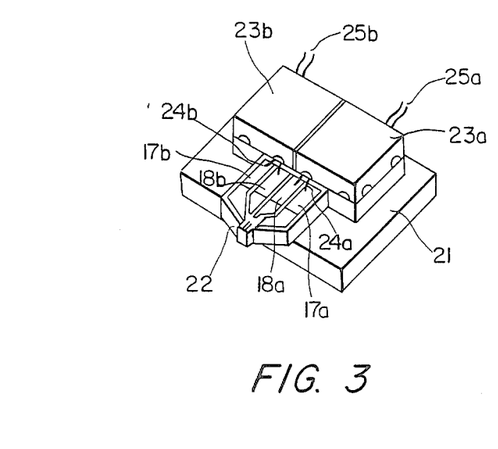
FIG. 3 illustrates a schematic figure of the heads with step-up transformers as an embodiment of the present invention.

FIG. 3 shows a schematic view of the heads constructed together with step-up transformers on a head base. The numerals 21 and 22 denote a head base and the multi-track magnetic thin film heads, respectively. The numerals 23a, 23b designate step-up transformers, and the numerals 24a, 24b and 25a, 25b denote primary coils of the step-up transformers 23a, 23b, and secondary coils thereof, respectively. In this configuration, the coils 17a, 18a and 17b, 18b are connected to the primary coils 24a, 24b, respectively, so that the reproduced signals are delivered through the secondary coils 25a, 25b on the reproducing mode. As the heads 22 and the step-up transformers 23a, 23b are adjacently placed on the head base 21, it becomes possible to make leader lines of the primary coils 24a, 24b short and to reduce the useless inductance thereof, which causes an impedance noise, so that it becomes effective to step-up the reproduced signal.

Figure 4A:
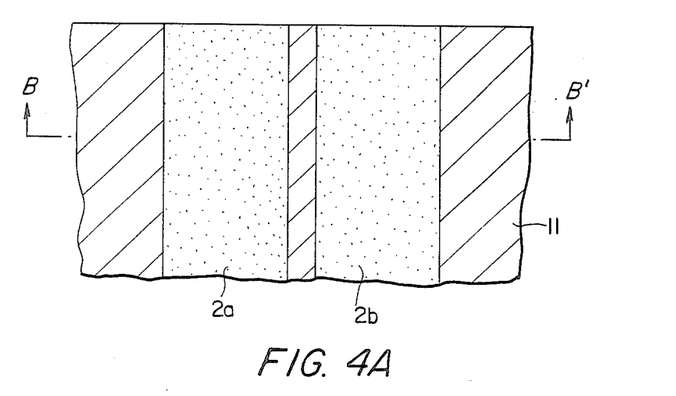
FIGS. 4A, 5A, 6A and 7A show plane views of each step of a producing method for the heads shown in FIG. 2A.
Figure 4B:
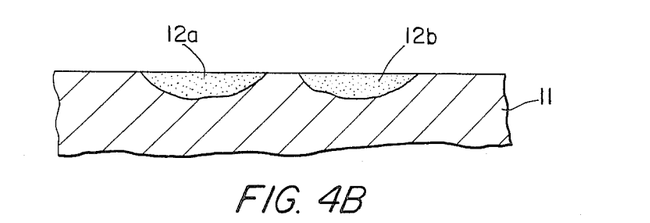
FIGS. 4B, 5B, 6B and 7B illustrate sectional views of each section shown in FIGS. 4A, 5A, 6A and 7A, respectively.

Next, a method for producing the multi-track magnetic thin film heads as described above will be explained. Referring to FIGS. 4A and 4B, non-magnetic materials, for example, glass, ceramic, ferrite, etc. are used for the non-magnetic substrate 11. In this embodiment, a ceramic substrate comprising at least MnO and NiO is used. In the case that it contains 50 to 60 mole percentages of MnO, the coefficient of thermal expansion becomes about $140 \times 10^{-7}/°C.$, so that the coefficient approximately becomes the same value as the coefficient of a soft magnetic material used for the magnetic cores, for example, a sendust or an amorphous material, etc. Further, this ceramic substrate especially fits in a recording medium using metal powders.

First, grooves for the lower magnetic cores 12a, 12b are formed on the non-magnetic substrate 11. In this step, the grooves having curved lower surfaces shown in FIG. 4B are shaped by a mechanical or other process, so that the lower surface thereof becomes non-parallel to the surface of the substrate. It is better to make the width thereof about 200 μm and the depth thereof about 20-30 μm. After that, as the lower magnetic cores 12a, 12b, the soft magnetic material, that is, the sendust or the amorphous material, etc. is deposited about 30 μm on the substrate 11 by sputtering, or other process, and the soft magnetic material except one in the grooves is removed by lapping or other process, so that the non-magnetic substrate 11 has in the lower magnetic cores 12a, 12b in the surface thereof. Before sputtering the soft magnetic material, if a layer of Cr or Zr, or the like, having thickness of 0.1 to 1 μm is formed as an adhesive layer by sputtering, the attachment of the soft magnetic material to the substrate 11 will increase. FIG. 4B illustrates a sectional view of the B—B' section shown in FIG. 4A.

Figure 5A:
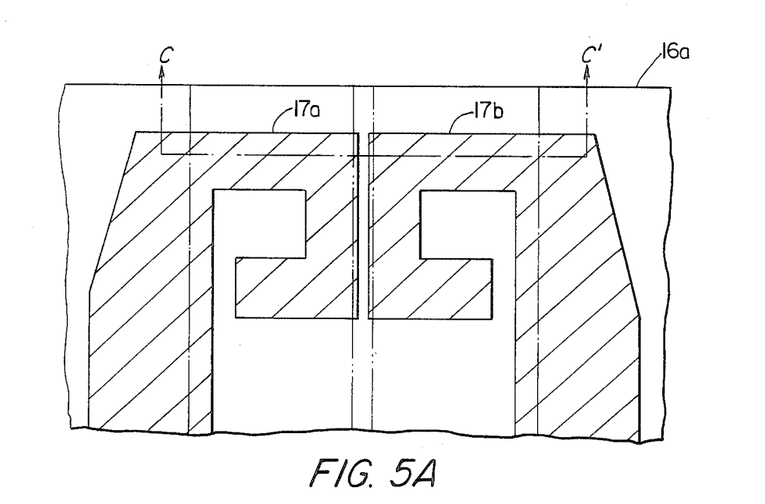
Figure 5B:
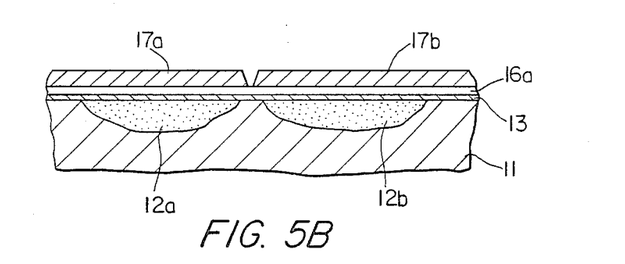

As shown in FIGS. 5A and 5B, a non-magnetic material 13 is sputtered about 0.2 to 0.3 μm as a gap material, a thickness of which determines a gap length of the head.

As the gap material 13, in case of using the amorphous material as the magnetic core material, a metal material such as Cr or Zr is suitable, and in the case of using the sendust as the magnetic core material, $SiO_2$ is suitable, in view of its adherence. Further, as the insulating layer 16a, $SiO_2$ having a thickness of about 1 μm is sputtered, and as the first layer coils 17a, 17b, Cr, Cu and further Cr, having thicknesses of about 500 Å, about 4 μm and about 500 Å, respectively, are sequentially superimposed, and etched to predetermined shapes. In this embodiment, each width of the first layer coils 17a, 17b between the back gap parts of the adjacent heads is about 10 μm.

Here, FIG. 5B shows a sectional view of the C—C' section shown in FIG. 5A.

Figure 6A:
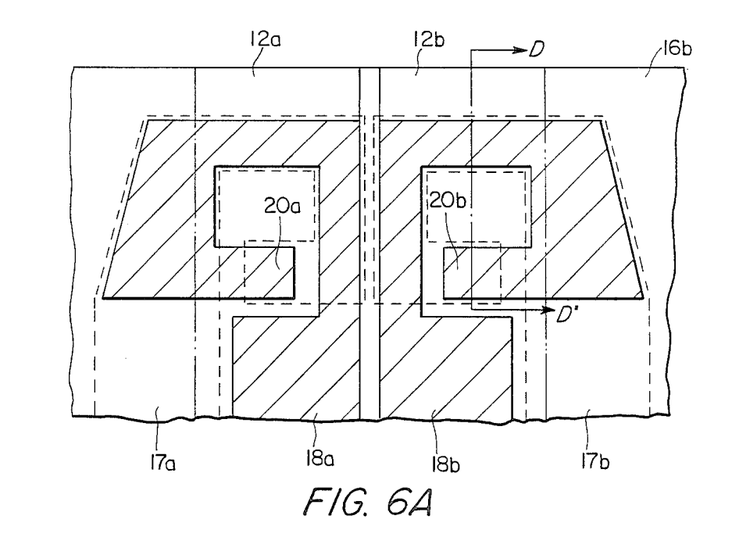
Figure 6B:
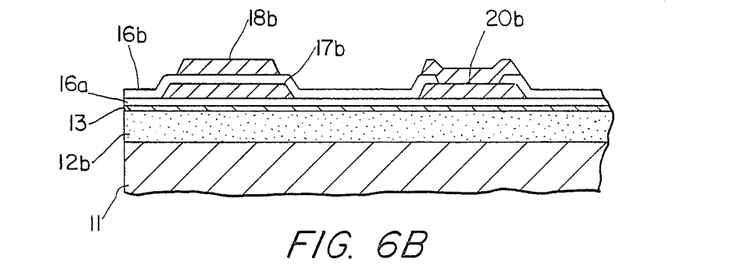

Next, as shown in FIGS. 6A and 6B, a layer of $SiO_2$ is deposited on the first layer coils 17a, 17b as the insulating layer 16b, and the through-holes 20a, 20b for connection between the first magnetic coils 17a, 17b and the second magnetic coils 18a, 18b are formed by etching the insulating material 16b. After that, as explained in connection with the first layer coils 17a, 17b, Cr, Cu and Cr are sequentially superimposed and the second layer coils 18a, 18b are shaped by etching. Here, FIG. 6B illustrates a sectional view of the D—D' section shown in FIG. 6a.

Figure 7A:
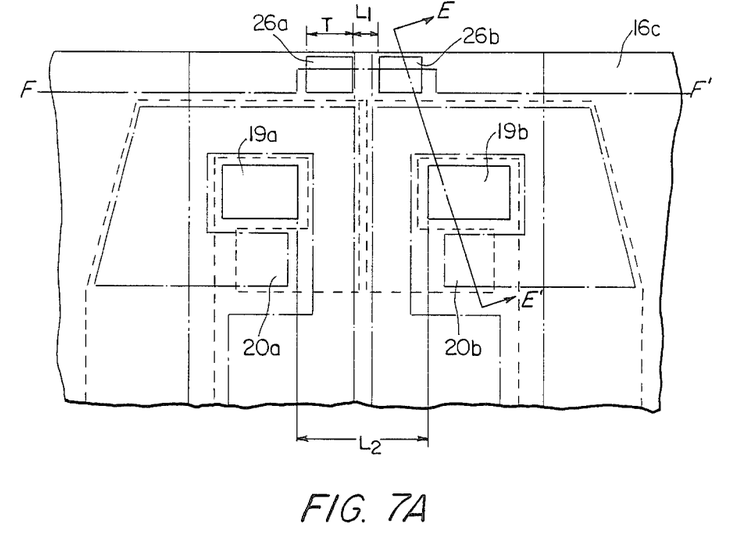
Figure 7B:
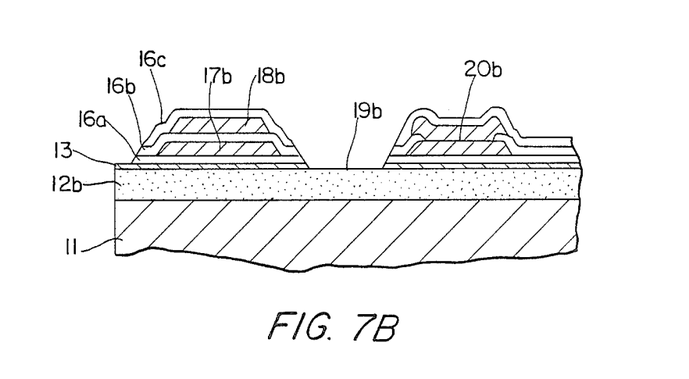

Further, as shown in FIGS. 7A and 7B, after a 3 μm layer of $SiO_2$ is deposited as the insulating layer 16C, the $SiO_2$ layers 16a, 16b and 16c are etched in order to shape magnetic gap parts 26a, 26b and through holes for the back gap parts 19a, 19b. And the gap material 13 at the back gap parts 19a, 19b is further removed by an etching process.

If a layer of $SiO_2$ is used for the gap material 13, this step has to be changed. Namely, in that case, after the $SiO_2$ layer is removed from the magnetic gap parts 26a, 26b and the back gap parts 19a, 19b, a new $SiO_2$ layer is deposited as gap material and is removed from the substrate 11 at the back gap parts 19a, 19b.

Next, in order to make the upper magnetic cores 14a, 14b, the sendust or the amorphous material is sputtered about 20 μm, and formed to predetermined shapes. Further, as a protective layer, a layer of SiO$_2$, when using the sendust as the upper magnetic cores 14a, 14b, or a mixed layer of MgO and SiO$_2$, when using the amorphous material, is formed on all elements except the coil pad parts, not shown in the Figures, by sputtering or evaporation process. The thickness thereof is equal to or larger than about 10 μm. Finally, the heads shown in FIGS. 2A, 2B and 2C are made by mechanical production along line F—F' of FIG. 7A. FIG. 7B shows a sectional view of the E—E' section of FIG. 7A.

Figure 8A:
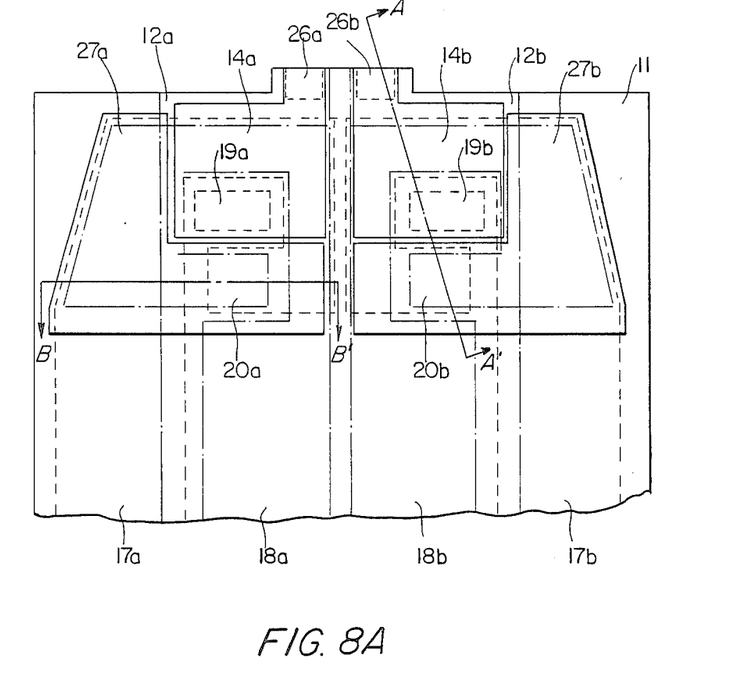
FIG. 8A shows a plan view of multi-track magnetic thin film heads as another embodiment of the present invention.
Figure 8B:
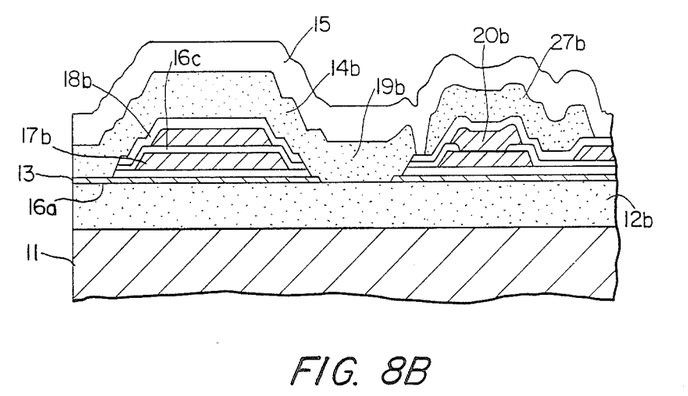
FIG. 8B shows a sectional figure of the A—A section of FIG. 8A.
Figure 8C:
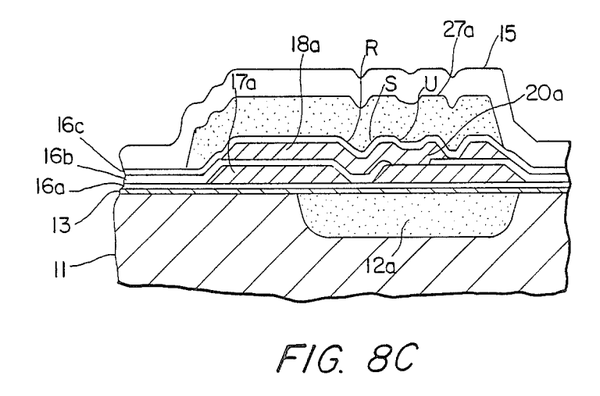
FIG. 8C shows a sectional figure of the B—B section of FIG. 8A.

FIGS. 8A, 8B and 8C show another embodiment of this invention. This embodiment is suitable for making the upper magnetic core by an ion-etching method. The ion-etching method is useful for forming patterns of the upper magnetic cores of the sendust or the amorphous material. However, the etching rate of tis method depends on the angle of a beam incidence. In general, the etching rate for an inclined part is higher than one for a flat part. As a result, there is a possibility that the coils are etched, too.

Therefore, in this embodiment, the inclined parts on the substrate 11, for example, the edges of the first layer coils 17a, 17b and the second layer coils 18a, 18b, the connection parts of the first layer coils 17a, 17b and the second layer coils 18a, 18b, etc. are covered by the soft magnetic material in the step of depositing the soft magnetic material for the upper magnetic cores 14a, 14b.

Referring to FIGS. 8A, 8B and 8C, the numerals 27A, 27B denote another pattern of the soft magnetic material covering the inclined parts. These patterns 27a, 27B prevent the coils 17a, 17b and 18a, 18b from being damaged by the ion etching. Specifically, if the inclined parts, which are indicated by letters R, S and U in FIG. 8C, are damaged by the ion etching, the magnetic heads become inoperative. The patterns 27a, 27b can effectively protect those parts.

The patterns of the soft magnetic material covering the inclined parts are not limited to the ones shown in FIG. 8A. It is possible to use patterns in which the upper magnetic cores 14a, 14b expand and contact the patterns 27a, 27b, respectively.

As explained in detail, this invention can provide the multi-track magnetic thin film heads which have less cross talk, less contour effect and less impedance noise on the reproducing mode, and as a result, the multi-track magnetic thin film heads can be adequately used for recording and reproducing an analog signal like an electronic still camera.

We claim:

1. Multi-track magnetic thin film heads constructed on a single non-magnetic substrate, each head having a front gap part for forming a front gap to be adjacent to a magnetic medium and a back gap part, for recording information on the magnetic medium and reproducing it therefrom, comprising:
   lower magnetic cores corresponding in number to the number of heads, said lower magnetic cores being spaced apart and separate from each other, said lower magnetic cores being buried at least partly in a surface of the non-magnetic substrate, and having a front gap part and a back gap part;
   coils, for each of said heads, being electrically insulated from each other, each of said coils being formed on the non-magnetic substrate except for the front gap part and the back gap part of the lower magnetic cores, and at least a part of each coil being on the respective lower magnetic core;
   upper magnetic cores corresponding in number to the number of heads, said upper magnetic cores being separate from each other, and said upper magnetic cores being constructed for each head respectively on said lower magnetic core and said coils and each of said upper magnetic cores having a front gap part and a back gap part aligned with and above the corresponding front gap part and back gap part of said lower magnet cores of the same head;
   magnetic gap material placed between said lower magnetic cores and said upper magnetic cores in at least the front gap part;
   said lower magnetic core of each head having a lower edge that is adjacent to the respective front gap, said lower edge being not parallel to edges of the front gap thereof.

2. Multi-track magnetic thin film heads constructed on a single non-magnetic substrate, each of the heads has a front gap part for forming a front gap to be adjacent to a magnetic medium and a back gap part, comprising:
   first magnetic cores corresponding in number to the number of heads, said first magnetic cores being spaced apart and separate from each other on the non-magnetic substrate, and having a front gap part and a back gap part;
   coils for each of said heads, said coils being electrically insulated from each other, each of said coils being formed on the non-magnetic substrate except the front gap part and the back gap part of the first magnetic cores of each head, and at least a part of each coil being on the respective first magnetic core;
   second magnetic cores corresponding in number to the number of heads, each of said second magnetic cores having a front gap part and a back gap part, aligned with and above the corresponding front gap part and back gap part of said first magnetic cores of the same head, said second magnetic cores being opposite to said first magnetic cores;
   each of said front gap parts of said magnetic cores having a front gap direction extending longitudinally to define a track witdth and each of said front gap parts of said magnetic cores forming a portion of a common surface for substantially contacting the magnetic medium with the direction of travel of the magnetic medium being along said common surface and crossing said front gaps;
   magnetic gap material placed between said first magnetic cores and said second magnetic cores at at least the front gap part; and
   the distance between the front gap parts of adjacent heads, as measured in a measurement direction parallel to said non-magnetic substrate and said front gap longitudinal extending direction along said common surface, being larger than the corresponding distance measured in said measurement direction between the back gap parts thereof each of said coils having a coil portion extending between the back gap parts of adjacent heads, and each of said coils being entirely spaced apart from the area between the front gap parts of adjacent heads, whereby the front gap parts may be closely spaced for improved recording density and sufficient room is provided between the back gap parts for spacing of said coil portions sufficiently to provide sufficiently low impedance in the coil.

3. Multi-track magnetic thin film heads according to claim 2, wherein said second magnetic cores are spaced apart from each other.

4. Multi-track magnetic thin film heads according to claim 3, wherein said first magnetic cores are buried in a surface of the nonmagnetic substrate.

5. Multi-track magnetic thin film heads constructed on a single nonmagnetic substrate, each of the heads has a front gap part for forming a front gap to be adjacent to a magnetic medium and a back gap part, comprising:
   first magnetic cores corresponding in number to the number of heads, said first magnetic cores being spaced apart and separate from each other on the non-magnetic substrate, and having a front gap part and a back gap part;
   coils for each of said heads, said coils being electrically insulated from each other, each of said coils being formed on the non-magnetic substrate except the front gap part and the back gap part of the first magnetic cores of each head, and at least a part of each coil being on the respective first magnetic core;
   second magnetic cores corresponding in number to the number of heads, each of said second magnetic cores having a front gap part and a back gap part, aligned with and above the corresponding front gap part and back gap part of said first magnetic cores of the same head, said second magnetic cores being opposite to said first magnetic cores;
   magnetic gap material placed between said first magnetic cores and said second magnetic cores at at least the front gap part;
   the distance between the back gap parts of adjacent heads being larger than the distance between the front gap parts thereof;
   said second magnetic cores being spaced apart from each other;
   said first magnetic cores being buried in a surface of the nonmagnetic substrate; and
   said first magnetic core of each head having a lower edge that is adjacent to the respective front gap, said lower edge being not parallel to edges of said magnetic gap material at the front gap thereof.

6. Multi-track magnetic thin film heads according to claim 2, wherein the non-magnetic substrate is made of a ceramic material comprising at least MnO and NiO.

7. Multi-track magnetic thin film heads according to claim 6, wherein the content of said MnO is 50 to 60 mole percentages.

8. Multi-track magnetic thin film heads according to claim 7, wherein a material of said first magnetic cores and said second magnetic cores is an amorphous material including Co, Nb and Zr, and said magnetic gap material is Cr.

9. Multi-track magnetic thin film heads according to claim 7, wherein a material of said first magnetic cores and said second magnetic cores is an amorphous material including Co, Nb and Zr, and said magnetic gap material is Zr.

10. Multi-track magnetic thin film heads according to claim 4, further comprising: at least one of said cores and coils having inclined parts non-parallel with the substrate, and layers covering the inclined parts on the substrate, said layers being of the same material as said second magnetic cores.

11. Mutli-track magnetic thin film heads according to claim 10, wherein each of said layers for each head is spaced apart from said second magnetic core for the same head.

12. Multi-track magnetic thin film heads according to claim 11, wherein corresponding ones of said layers for adjacent heads are spaced apart from each other.

13. Multi-track magnetic thin film heads according to claim 2, wherein the width of each of said first magnetic cores and second magnetic cores at the back gap parts being larger than the width of a track.

14. Multi-track magnetic thin film heads according to claim 13, wherein each of said first magnetic cores and second magnetic cores has a non-symmetrical shape with respect to the central axis of the track.

15. Multi-track magnetic thin film heads according to claim 2, further comprising:
   a protective layer formed on at least said second magnetic cores, said protective layer being composed of a ceramic material comprising at least MgO and $SiO_2$.

16. Multi-track magnetic thin film heads according to claim 15, wherein said second magnetic cores are made of an amorphous material.

17. Multi-track magnetic thin film heads according to claim 2, further comprising:
   said front gaps of said heads being formed on a common contact surface with said front gaps being formed on said contact surface, said contact surface being adjacent to and to contact the magnetic medium; and
   the width of said contact surface being greater than the sum of the distance of the front gap parts of the adjacent heads as measured in the same direction on said surface plus the track width of each head as measured in said direction on said surface, and being smaller than said sum plus an additional track width.

* * * * *